(12) United States Patent
Hu et al.

(10) Patent No.: US 10,914,990 B2
(45) Date of Patent: Feb. 9, 2021

(54) VERTICAL ALIGNMENT DISPLAY PANEL AND DISPLAY APPARATUS

(71) Applicant: BOE Technology Group Co., Ltd., Beijing (CN)

(72) Inventors: Yong Hu, Beijing (CN); Xinyin Wu, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 15/769,513

(22) PCT Filed: Aug. 31, 2017

(86) PCT No.: PCT/CN2017/100005
§ 371 (c)(1),
(2) Date: Apr. 19, 2018

(87) PCT Pub. No.: WO2018/137343
PCT Pub. Date: Aug. 2, 2018

(65) Prior Publication Data
US 2019/0258104 A1     Aug. 22, 2019

(30) Foreign Application Priority Data
Jan. 24, 2017   (CN) .................... 2017 2 0105079 U (51) Int. Cl.
*G02F 1/1339* (2006.01)
*G02F 1/1343* (2006.01)

(52) U.S. Cl.
CPC ........ *G02F 1/13394* (2013.01); *G02F 1/1339* (2013.01); *G02F 1/134309* (2013.01); *G02F 2201/121* (2013.01)

(58) Field of Classification Search
CPC ............. G02F 1/13392; G02F 1/13394; G02F 1/134309
See application file for complete search history.

(56) References Cited

U.S. PATENT DOCUMENTS

| 7,705,941 B2 | 4/2010 | Jang |
| 7,978,299 B2 * | 7/2011 | Goto .................... G02F 1/13394 349/155 |

(Continued)

FOREIGN PATENT DOCUMENTS

| CN | 103676259 A | 9/2007 |
| CN | 101452158 A | 6/2009 |

(Continued)

OTHER PUBLICATIONS

English translation of International Search Report and Written Opinion for International Application No. PCT/CN2017/100005, dated Nov. 30, 2017, 10 pages.

*Primary Examiner* — Dung T Nguyen
(74) *Attorney, Agent, or Firm* — Westman, Champlin & Koehler, P.A.

(57) ABSTRACT

A vertical alignment display panel is disclosed. The display panel includes: an array substrate; an opposite substrate disposed opposite to the array substrate; and a first spacer and a second spacer which are disposed in a non-pixel region between the array substrate and the opposite substrate. The first spacer and the second spacer have the same height, the first spacer is configured to be in contact with the array substrate and the opposite substrate, respectively, the second spacer has a bottom end disposed on one of the array substrate and the opposite substrate, and at least one of the array substrate and the opposite substrate is formed with a first recess region corresponding to the second spacer. A display apparatus with the vertical alignment display panel is also disclosed.

10 Claims, 4 Drawing Sheets

(56) References Cited

U.S. PATENT DOCUMENTS

| | | |
|---|---|---|
| 8,023,092 B2 | 9/2011 | Tatemori et al. |
| 2007/0002263 A1* | 1/2007 | Kim .................... G02F 1/13394 349/156 |
| 2009/0079927 A1 | 3/2009 | Yamamoto et al. |
| 2009/0231522 A1* | 9/2009 | Kim .................... G02F 1/13394 349/106 |
| 2013/0169908 A1* | 7/2013 | Iwamoto ................. G02F 1/139 349/96 |
| 2014/0198284 A1* | 7/2014 | Weng ................ G02F 1/133371 349/106 |

FOREIGN PATENT DOCUMENTS

| | | |
|---|---|---|
| CN | 202472188 U | 10/2012 |
| CN | 103676259 A | 3/2014 |
| CN | 103926747 A | 7/2014 |
| CN | 206400229 U | 8/2017 |

* cited by examiner

VERTICAL ALIGNMENT DISPLAY PANEL AND DISPLAY APPARATUS

CROSS-REFERENCE TO RELATED APPLICATION

This application is a Section 371 National Stage Application of International Application No. PCT/CN2017/100005, filed on 31 Aug. 2017, entitled "VERTICAL ALIGNMENT DISPLAY PANEL AND DISPLAY APPARATUS", which has not yet published, which claims priority to Chinese Application No. 201720105079.3, filed on 24 Jan. 2017, incorporated herein by reference in their entirety.

BACKGROUND

1. Technical Field

The present disclosure relates to the field of display technology, and particularly to a vertical alignment (VA) display panel and a display apparatus.

2. Description of the Related Art

Generally, a liquid crystal display panel comprises a color filter substrate and an array substrate which are disposed opposite to each other, and a liquid crystal layer disposed between the color filter substrate and the array substrate. Generally spacers are disposed between the color filter substrate and the array substrate to maintain a gap between the color filter substrate and the array substrate. At present, there is a design in which two different types of spacers are disposed between the color filter substrate and the array substrate. A first spacer of the two different types of spacers is used to maintain the gap between the color filter substrate and the array substrate, while a second spacer of the two different types of spacers has a different height from the first spacer and is used to support the color filter substrate and the array substrate when the color filter substrate and the array substrate are pressed, thereby speeding up restorations of the color filter substrate and the array substrate. At present, there are two solutions when the first spacer and the second spacer which have different heights are manufactured. In a first one of the two solutions, in the process of formation of the spacers, a half-tone or gray-tone mask is used for performing an exposure. Light intensities required for formation of the different spacers in the exposure are strictly controlled, so that a design of a difference of the heights is achieved after performing a development. However, in this way, the used mask is expensive. In a second one of the two solutions, a common mask is used for performing an exposure. However, in this way, it is necessary to strictly control a manufacturing process since the two types of spacers with different heights have different sizes (sizes of cross sections of bottoms and heights) and the second spacer has a smaller size. Existing processes for manufacturing the first spacer and the second spacer are all relatively complicated.

SUMMARY

In accordance with an aspect of the present disclosure, there is provided a vertical alignment display panel.

According to an exemplary embodiment, the vertical alignment display panel may comprise: an array substrate; an opposite substrate disposed opposite to the array substrate; and a first spacer and a second spacer which are disposed in a non-pixel region between the array substrate and the opposite substrate. The first spacer and the second spacer have the same height, the first spacer is configured to be in contact with the array substrate and the opposite substrate, respectively, the second spacer has a bottom end disposed on one of the array substrate and the opposite substrate, and at least one of the array substrate and the opposite substrate is formed with a first recess region corresponding to the second spacer.

According to another exemplary embodiment, the vertical alignment display panel may further comprise a first film disposed on the array substrate and a second film disposed on the opposite substrate; and the first recess region is formed in at least one of the first film and the second film.

According to a further exemplary embodiment, the vertical alignment display panel may comprise a plurality of first spacers and a plurality of second spacers, and at least one of the first film and the second film is formed with a plurality of first recess regions respectively corresponding to the plurality of second spacers.

According to a further exemplary embodiment, the plurality of first recess regions may be uniformly distributed in a display region of the vertical alignment display panel.

According to a further exemplary embodiment, the vertical alignment display panel may further comprise an photoelectric medium layer filled between the array substrate and the opposite substrate; and at least one of the first film and the second film is formed with a second recess region in a pixel region such that a molecule in the photoelectric medium layer is oriented at a pretilt angle by the second recess region.

According to a further exemplary embodiment, at least one of the first film and the second film comprises the first recess region and the second recess region.

According to a further exemplary embodiment, at least one of the first recess region and the second recess region may comprise a through hole which passes through the first film or the second film in a direction perpendicular to a plane in which the array substrate or the opposite substrate is located.

According to a further exemplary embodiment, the first recess region is formed on one, facing a top surface of the second spacer, of the array substrate and the opposite substrate, and an opening of the first recess region corresponds in shape to the top surface of the second spacer, and an area of the opening may be set to be equal to or less than an area of the top surface of the second spacer.

According to a further exemplary embodiment, the array substrate may further comprise a common electrode leading wire, and at least some of the first spacers and of the second spacers are disposed in a region corresponding to the common electrode leading wire.

According to a further exemplary embodiment, the first film may be a common electrode layer or a resin layer.

According to a further exemplary embodiment, the second film may be a pixel electrode layer or an insulating layer.

In accordance with another aspect of the present disclosure, there is also provided a display apparatus. The display apparatus may comprise the vertical alignment display panel described in any one of the embodiments in the foregoing.

BRIEF DESCRIPTION OF THE DRAWINGS

The above and other features of the present disclosure will become more apparent from the following description of exemplary embodiments taken in conjunction with the accompanying drawings, in which.

DETAILED DESCRIPTION OF THE EMBODIMENTS

Exemplary embodiments of the present disclosure will be described as follows in detail in conjunction with the accompanying drawings. Like features are indicated by like reference signs in the accompanying drawings. The present disclosure may also be achieved in other different manners. Therefore, the present disclosure should not be construed to be limited to only the embodiments expound in the description. These embodiments are provided to enable those skilled in the art to understand the inventive concept of the present disclosure sufficiently and completely.

According to a general inventive concept of the present disclosure, there is provided a VA display panel and a display apparatus.

The VA display panel comprises: an array substrate; an opposite substrate disposed opposite to the array substrate; and a first spacer and a second spacer which are disposed in a non-pixel region between the array substrate and the opposite substrate. The first spacer and the second spacer have the same height, the first spacer is configured to be in contact with the array substrate and the opposite substrate, respectively, the second spacer is disposed on one of the array substrate and the opposite substrate, and at least one of the array substrate and the opposite substrate is formed with a first recess region corresponding to the second spacer.

It should be noted that in the embodiments of the present disclosure, the VA display panel comprises a plurality of light blocking strips crossing one another. The plurality of light blocking strips crossing one another delimit a plurality of pixel regions. Accordingly, a region in which the light blocking strips are located is a non-pixel region. The light blocking strips may comprise a metal wire of the array substrate and/or a black matrix of the opposite substrate, and the like.

Herein the height of each of the first spacer and the second spacer refers to a vertical distance between its top end and bottom end, as shown in FIGS. 1a-1h and FIGS. 2 and 3.

With the technical solution of the present disclosure, the first spacer functions to maintain a gap between the two substrates, and the second spacer is capable of preventing the two substrates from being excessively pressed and facilitates restorations of the two substrates after a press is released. In this structure, the first spacer and the second spacer have the same height so that a manufacturing process can be simplified.

In a different embodiment, the VA display panel may further comprise a first film disposed on the array substrate and a second film disposed on the opposite substrate; and the first recess region is formed in the first film or the second film.

It should be noted that the first film and the second film may be films separately disposed for forming the first recess region, or may also be inherent films in the VA display panel so that no additional films are needed and thus a thickness of the VA display panel will not be increased.

Based on the basic inventive concept of the present disclosure, FIG. 1a to FIG. 1h show eight exemplary embodiments of the present disclosure, respectively. As shown in FIG. 1a to FIG. 1h, the following common features are included in the eight embodiments. The VA display panel comprises: an array substrate 001 and an opposite substrate 002 disposed opposite to each other, and a plurality of first spacers 004 and a plurality of second spacers 005, which are disposed in a non-pixel region 003 between the array substrate 001 and the opposite substrate 002. The first spacer 004 and the second spacer 005 have the same height, and the first spacer 004 is in contact with the array substrate 001 and the opposite substrate 002, respectively. However, there are also some changes or differences among the embodiments. The changes and differences all fall into the scope of the inventive concept of the present disclosure.

Figure 1A:
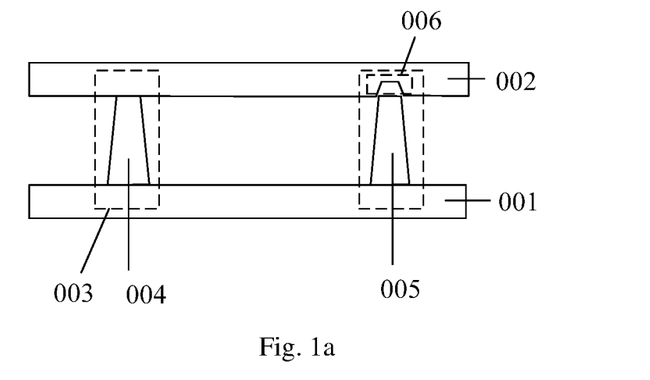
FIG. 1a is a schematic diagram showing a structure of a VA display panel according to a first embodiment of the present disclosure.

In the first embodiment shown in FIG. 1a, the opposite substrate 002 is formed with a first recess region 006, and the second spacer 005 is disposed in a position corresponding to (for example aligned with or substantially aligned with) the first recess region 006, on the array substrate 001, so that the second spacer 005 is in contact with the array substrate 001 and is not in contact with the opposite substrate 002.

Figure 1B:
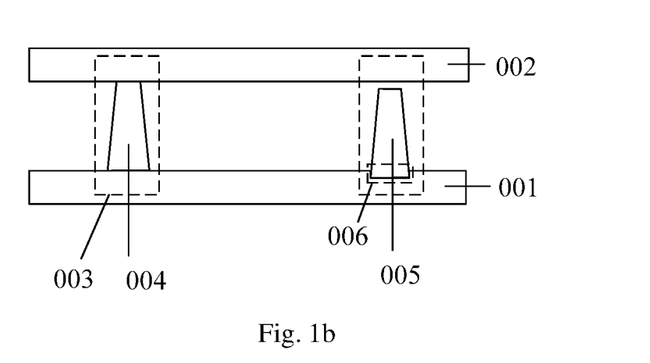
FIG. 1b is a schematic diagram showing a structure of a VA display panel according to a second embodiment of the present disclosure.

In the second embodiment shown in FIG. 1b, the array substrate 001 is formed with a first recess region 006, and an end of the second spacer 005 is disposed in the first recess region 006, so that the second spacer 005 is in contact with the array substrate 001 and is not in contact with the opposite substrate 002.

Figure 1C:
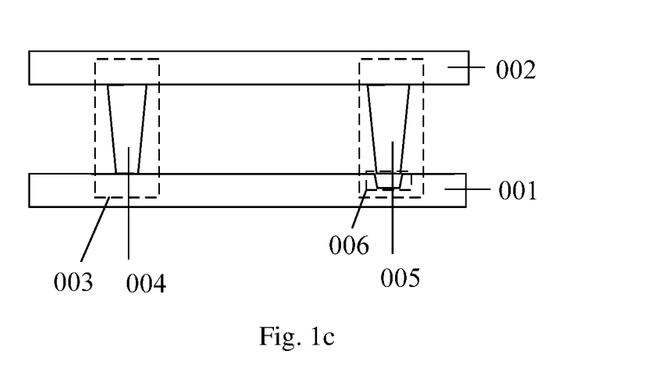
FIG. 1c is a schematic diagram showing a structure of a VA display panel according to a third embodiment of the present disclosure.

In the third embodiment shown in FIG. 1c, the array substrate 001 is formed with a first recess region 006, and the second spacer 005 is disposed in a position corresponding to the first recess region 006, on the opposite substrate 002, so that the second spacer 005 is not in contact with the array substrate 001 and is in contact with the opposite substrate 002.

Figure 1D:
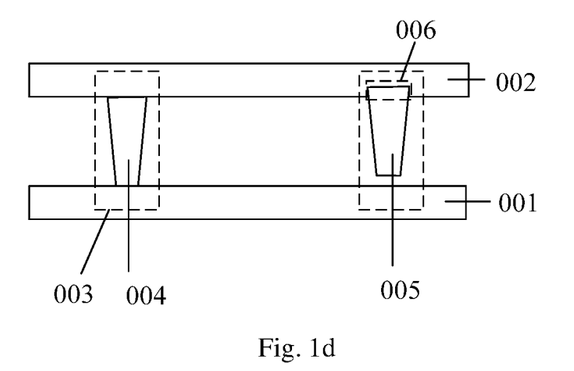
FIG. 1d is a schematic diagram showing a structure of a VA display panel according to a fourth embodiment of the present disclosure.

In the fourth embodiment shown in FIG. 1d, the opposite substrate 002 is formed with a first recess region 006, and an end of the second spacer 005 is disposed in the first recess region 006, so that the second spacer 005 is not in contact with the array substrate 001 and is in contact with the opposite substrate 002.

Figure 1E:
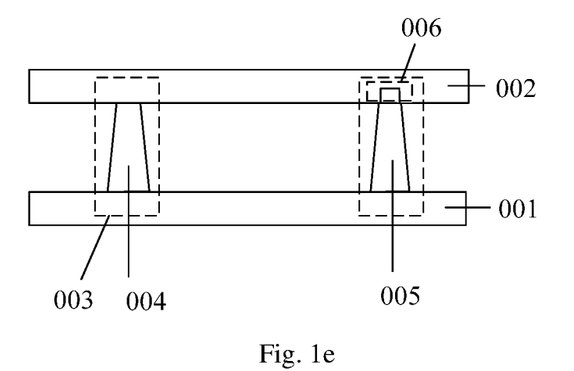
FIG. 1e is a schematic diagram showing a structure of a VA display panel according to a fifth embodiment of the present disclosure.

In the fifth embodiment shown in FIG. 1e, the opposite substrate 002 is formed with a first recess region 006, and the second spacer 005 is disposed in a position corresponding to the first recess region 006, on the array substrate 001, so that the second spacer 005 is in contact with both the array substrate 001 and the opposite substrate 002.

Figure 1F:
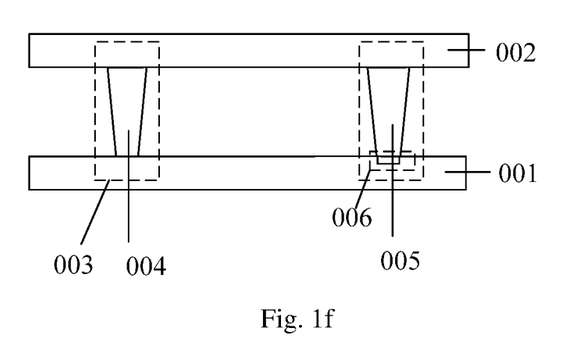
FIG. 1f is a schematic diagram showing a structure of a VA display panel according to a sixth embodiment of the present disclosure.

In the sixth embodiment shown in FIG. 1*f*, the array substrate 001 is formed with a first recess region 006, and the second spacer 005 is disposed in a position corresponding to the first recess region 006, on the opposite substrate 002, so that the second spacer 005 is in contact with both the array substrate 001 and the opposite substrate 002.

Figure 1G:
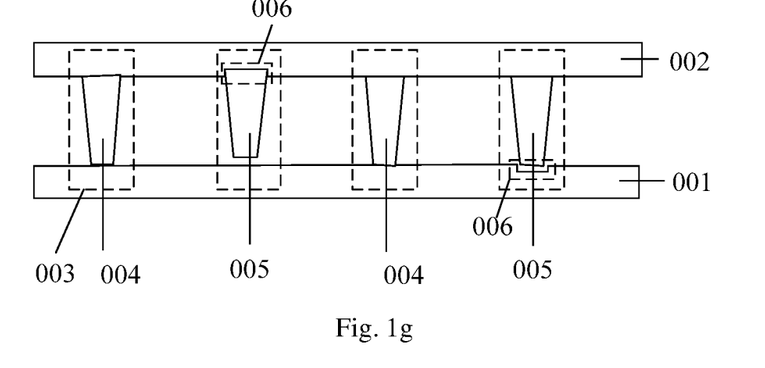
FIG. 1g is a schematic diagram showing a structure of a VA display panel according to a seventh embodiment of the present disclosure.

In the seventh embodiment shown in FIG. 1*g*, the opposite substrate 002 is formed with a first recess region 006, the array substrate 001 is formed with another first recess region 006, an end of a second spacer 005 is disposed in the first recess region 006 of the array substrate 002, and another second spacer 005 is disposed in a position corresponding to the first recess region 006, on the opposite substrate 002, so that both the second spacers 005 are not in contact with the array substrate 001 and are in contact with the opposite substrate 002.

Figure 1H:
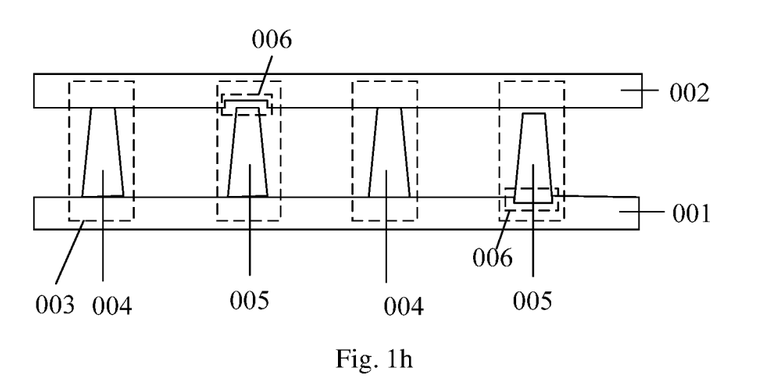
FIG. 1h is a schematic diagram showing a structure of a VA display panel according to an eighth embodiment of the present disclosure.

In the eighth embodiment shown in FIG. 1*h*, the opposite substrate 002 is formed with a first recess region 006, the array substrate 001 is formed with another first recess region 006, a second spacer 005 is disposed in a position corresponding to the first recess region 006, on the array substrate 001, and an end of another second spacer 005 is disposed in the first recess region 006 of the array substrate 001, and so that both the second spacers 005 are not in contact with the opposite substrate 002 and are in contact with the array substrate 001.

It should be noted that the phase "corresponding to" used in the above embodiments and to be used hereinafter may contain for example the meaning "being aligned with" or "being substantially aligned with", and the phases "corresponding to" and "being aligned with" all refer to a correspondence and an alignment in a vertical direction shown in the figures or in a direction perpendicular to a plane in which the array substrate and the opposite substrate are located.

The foregoing illustrates only several possible embodiments based on the concept of the present disclosure, rather than all of the embodiments. For example, each second spacer 005 may be disposed in any one selected from six manners shown in FIG. 1*a* to FIG. 1*f*. Therefore, when the display panel comprises a plurality of second spacers, the second spacers may be disposed in different manners. In addition, the array substrate and the opposite substrate may also be respectively formed with a pair of recesses corresponding to (for example being aligned with) each second spacer. A bottom end of the second spacer is disposed in one of the pair of recesses, and a top end of the second spacer faces the other of the pair of recesses.

With the above different embodiments, in addition to providing a support, different advantageous effects can be provided.

In the first and third embodiments shown in FIG. 1*a* and FIG. 1*c*, the recess region may be set to correspond in shape to the top of the second spacer, and a size or an area of the opening of the recess region is equal to or corresponds to a size or an area of the top end of the second spacer. Therefore, when the array substrate and the opposite substrate are pressed, the top end of the second spacer is received just in the first recess, so that it is able not only to serve for supporting in a vertical direction shown in the figures, but also to serve for the limitation of positions in the other directions.

In the fifth embodiment and the sixth embodiment shown in FIG. 1*e* and FIG. 1*f*, a size or an area of the opening of the first recess region may be set to be slightly less than a size or an area of the top end of the second spacer, so that a part of the top end of the second spacer abuts against the array substrate 001 (FIG. 1*f*) or the opposite substrate 002 (FIG. 1*e*), and the second spacer is formed of an elastic material. In this way, when the array substrate 001 and/or the opposite substrate 002 are pressed, the top end of the second spacer will be at least partly deformed to be pressed into the first recess region. When the array substrate 001 and/or the opposite substrate 002 are restored from a pressed state, an elastic restoring force of the second spacer helps a restoration of a part of the substrate located around the recess.

In the embodiments, the VA display panel further comprises a photoelectric medium layer filled between the array substrate and the opposite substrate. The photoelectric medium layer may be, but is not limited to, a vertical alignment liquid crystal layer. In order that a molecule of the photoelectric medium layer has a pretilt angle, a second recess region (to be described in detail below) may be formed within a pixel region in at least one film on the opposite substrate and the array substrate. Since the molecule of the photoelectric medium layer will be perpendicular to an inclined surface of the second recess region, it will be oriented at a pretilt angle. The film formed with the second recess region for orienting the molecule at the pretilt angle may be a film that is specially provided, or an inherent film in the display panel.

In order to simplify a structure of the display panel, the first recess region in the embodiments of the present disclosure may be formed in the film that is formed with the second recess region for orienting the molecule at the pretilt angle. In this way, the first recess region and the second recess region can be manufactured together so that a manufacturing process is simplified. Therefore, the first film and the second film are each formed with the second recess region in the pixel region, and the photoelectric medium layer is oriented at the pretilt angle by the second recess region. For example, the second recess region formed in the first film and the second recess region formed in the second film are not completely the same in pattern and position.

It should be noted that in the embodiments of the present disclosure, the other regions outside the first recess region and the second recess region are relatively protruded regions.

For example, the array substrate further comprises a metal wire located in the non-pixel region. At least some of the first spacers and of the second spacers are disposed on the metal wire of the array substrate or in a region corresponding to a black matrix of the opposite substrate (or color filter substrate). In the present embodiment, it is more favorable to stability of the spacers to dispose the first spacers and the second spacers in a position of the flat metal wire. The metal wire may be a common electrode leading wire. Generally the common electrode leading wire may be relatively wide, and thus is more favorable to stable disposing of the spacers.

Figure 2:
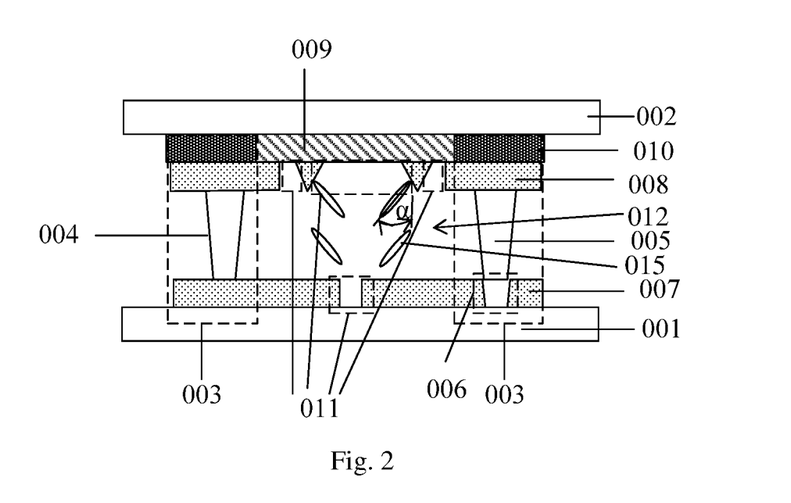
FIG. 2 is a schematic diagram showing a structure of a VA display panel according to a ninth embodiment of the present disclosure.

FIG. 2 shows a liquid crystal display panel according to a ninth embodiment of the present disclosure. In the ninth embodiment, the liquid crystal display panel comprises: an array substrate 001 and an opposite substrate 002 disposed opposite to each other; a liquid crystal layer (not shown) filled between the array substrate 001 and the opposite substrate 002; a first film 007 disposed on the array substrate 001; a second film 008 disposed on the opposite substrate 002; a color filter layer 009 disposed in a pixel region between the opposite substrate 002 and the second film 008; a black matrix 010 disposed in a non-pixel region between the opposite substrate 002 and the second film 008; and a plurality of first spacers 004 and a plurality of second spacers 005, which are disposed in the non-pixel region 003 on the opposite substrate 002 and have the same height. The first spacer 004 is in contact with the array substrate 001 and the opposite substrate 002, respectively, and the second spacer 005 is in contact with only the opposite substrate 002. Specifically, the array substrate 001 is formed with a first recess region 006, and the second spacer has one end disposed on the opposite substrate 002, and the other end which corresponds to the first recess region 006 and is not in contact with the array substrate 001. The first recess region 006 is formed in the first film 007, and a second recess region 011 by which a molecule 015 of the liquid crystal layer 012 is oriented at a pretilt angle is further formed in the pixel region in the first film 007. Likewise, a second recess region 011 by which a molecule 015 of the liquid crystal layer 012 is oriented at a pretilt angle α is also formed in the second film 008.

According to an exemplary embodiment, the opposite substrate 002 is a color filter substrate.

Figure 3:
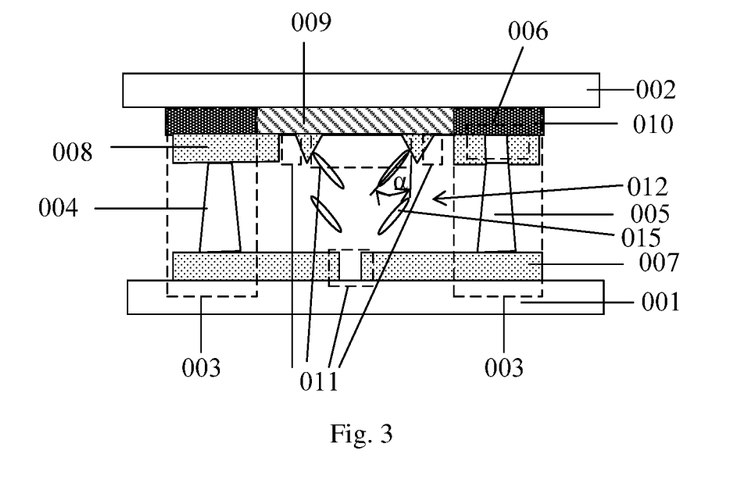
FIG. 3 is a schematic diagram showing a structure of a VA display panel according to a tenth embodiment of the present disclosure.

As a modification to the ninth embodiment shown in FIG. 2, FIG. 3 shows a liquid crystal display panel according to a tenth embodiment of the present disclosure. In the tenth embodiment, a first spacer 004 and a second spacer 005 are disposed on the array substrate 007, as shown in FIG. 3. The opposite substrate 002 is formed with a first recess region 006, and the first recess region 006 corresponds to an end of the second spacer 005 directed towards the opposite substrate.

In order that a molecule of the liquid crystal layer is oriented at a pretilt angle, on the opposite substrate, a resin layer may be formed of a resin material so that the second recess region mentioned above is formed in the resin layer, or an inherent common electrode layer may also be used so that the second recess region is formed in the common electrode layer. On the array substrate, the second recess region may be formed in an insulating layer, or the second recess region may also be formed in a pattern of an inherent pixel electrode layer. According to an exemplary embodiment, the first film is a common electrode layer or a resin layer, and the second film is a pixel electrode layer or an insulating layer.

Materials of the common electrode layer and the pixel electrode layer may be, but are not limited to, indium tin oxide (ITO).

In an exemplary embodiment, the first recess region and/or the second recess region may be blind holes/a blind hole which do/does not pass through the first film and/or the second film in a direction perpendicular to the array substrate or the opposite substrate (i.e. in a direction perpendicular to a plane in which the array substrate or the opposite substrate is located) as shown in FIG. 1a to FIG. 1h, or may be through holes/a through hole which pass/passes through the first film and/or the second film in the direction as shown in FIG. 2 and FIG. 3.

In addition, according to an exemplary embodiment, the plurality of first recess regions and the plurality of second spacers are distributed uniformly in the VA display panel, so that forces received by the second spacers are uniform.

Based on the same inventive concept, the present disclosure also provides a display apparatus comprising the VA display panel according to any one of the above embodiments.

In the VA display panel and the display apparatus according to the embodiments of the present disclosure, with the technical solution of the present disclosure, the first spacer functions to maintain a gap between the two substrates, and the second spacer is capable of preventing the two substrates from being excessively pressed and facilitates restorations of the two substrates after a press is released. In this structure, the first spacer and the second spacer have the same height so that a manufacturing process can be simplified.

Apparently, various changes and modifications to the present disclosure may be made by those skilled in the art without departing from the spirit and scope of the disclosure. Therefore, if these amendments and modifications to the present disclosure belong to the scope defined in the appended claims of the present disclosure and their equivalents, the present disclosure is intended to include these changes and modifications.

What is claimed is:

1. A vertical alignment display panel comprising:
an array substrate;
an opposite substrate disposed opposite to the array substrate;
a first spacer and a second spacer which are disposed in a non-pixel region between the array substrate and the opposite substrate, wherein the first spacer and the second spacer have a same height, the first spacer is configured to be in contact with the array substrate and the opposite substrate, respectively, each of the first spacer and the second spacer has a bottom end disposed on one of the array substrate and the opposite substrate, and the one of the array substrate and the opposite substrate is formed with a first recess region corresponding to the second spacer;
a first film disposed on or included in the array substrate;
a second film disposed on or included in the opposite substrate; and
a liquid crystal layer filled between the array substrate and the opposite substrate,
wherein at least one of the first film and the second film comprises a through hole which passes through the at least one of the first film and the second film in a direction perpendicular to the array substrate or the opposite substrate and which serves as the first recess region, and a through hole which passes through the at least one of the first film and the second film in the direction perpendicular to the array substrate or the opposite substrate and which serves as a second recess region and wherein the second recess region is formed in a pixel region such that a liquid crystal molecule in the liquid crystal layer is oriented at a pretilt angle by the second recess region.

2. The vertical alignment display panel of claim 1, wherein:
the vertical alignment display panel comprises a plurality of said first spacers and a plurality of said second spacers, and the at least one of the first film and the second film is formed with a plurality of first recess regions respectively corresponding to the plurality of second spacers.

3. The vertical alignment display panel of claim 2, wherein:
the plurality of first recess regions are uniformly distributed in a display region of the vertical alignment display panel.

4. The vertical alignment display panel of claim 1, wherein:
the other of the array substrate and the opposite substrate is formed with another first recess region, and a top surface of another second spacer corresponds in position to the another first recess region of the other of the array substrate and the opposite substrate, and an opening of the another first recess region corresponds in shape to the top surface of the another second spacer, and an area of the opening is set to be equal to or less than an area of the top surface of the another second spacer.

5. The vertical alignment display panel of claim 1, wherein:
the vertical alignment display panel comprises a plurality of said first spacers and a plurality of said second spacers, the opposite substrate further comprises a common electrode leading wire, and at least some of the first spacers and of the second spacers are disposed in a region corresponding to the common electrode leading wire.

6. The vertical alignment display panel of claim 1, wherein:
the second film is a common electrode layer or a resin layer.

7. The vertical alignment display panel of claim 1, wherein:
the first film is a pixel electrode layer or an insulating layer.

8. A display apparatus, comprising:
the vertical alignment display panel of claim 1.

9. The vertical alignment display panel of claim 1, wherein:
the other of the array substrate and the opposite substrate is formed with another first recess region corresponding in position to a top surface of another second spacer.

10. The vertical alignment display panel of claim 1, wherein:
the bottom end of the second spacer is disposed in the first recess region of the one of the array substrate and the opposite substrate, such that an end surface of the bottom end of the second spacer is farther from the other of the array substrate and the opposite substrate than an end surface of the bottom end of the first spacer.

* * * * *